INVENTORS
STIG ERIK WARRING
JARL MORANNAR THORSÉN

ATTORNEY

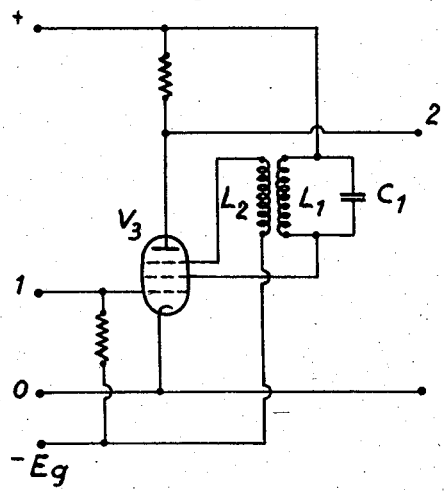
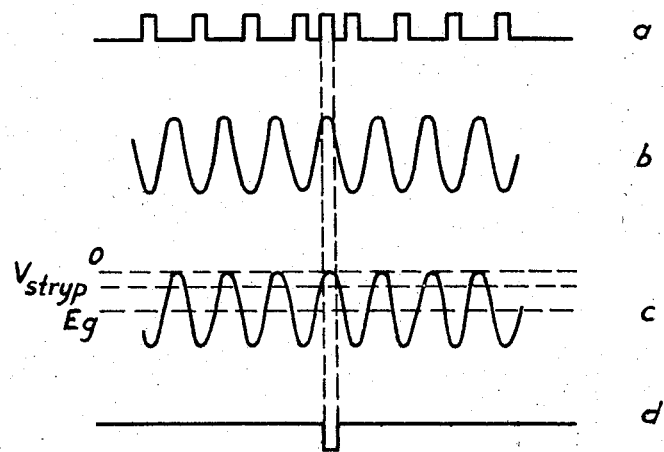

United States Patent Office 2,897,362
Patented July 28, 1959

2,897,362

MEANS FOR SELECTING A DETERMINED PULSE IN A PULSE TRAIN

Stig Erik Warring and Jarl Morannar Thorsén, Hagersten, Sweden, assignors to Telefonaktiebolaget L M Ericsson, Stockholm, Sweden, a corporation of Sweden Application February 14, 1956, Serial No. 565,502

Claims priority, application Sweden March 16, 1955

3 Claims. (Cl. 250—27)

The present invention relates to a method and to means for selecting determined pulses in a pulse train in which most pulses are separated by at least on an average inter se equal time intervals or by a whole multiple of that interval.

It is already known to give the pulse or pulses, which are to be selected, a shape differing from that of the rest of the pulses, for example with regard to the amplitude or the duration. It is also known to let the pulse, which is to be selected, be represented by a double or threefold pulse with characteristic time interval between the parts of said pulse, making it thereby possible to select this pulse easily from the other pulses.

The present invention differs from these known methods and is chiefly characterized by each pulse, which is to be selected, being on the transmitter side forced to appear in the middle of such a time interval, and by said pulse train on the receiver side generating a periodical voltage, the frequency of which is equal to the inverted value of the time of said interval, the selection of the pulses being effected with the aid of a coincidence means controlled by the periodical voltage and the pulse trains.

Figure 1:
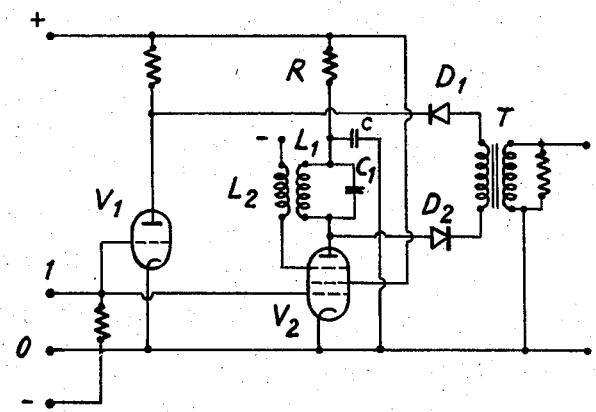
Figure 2:
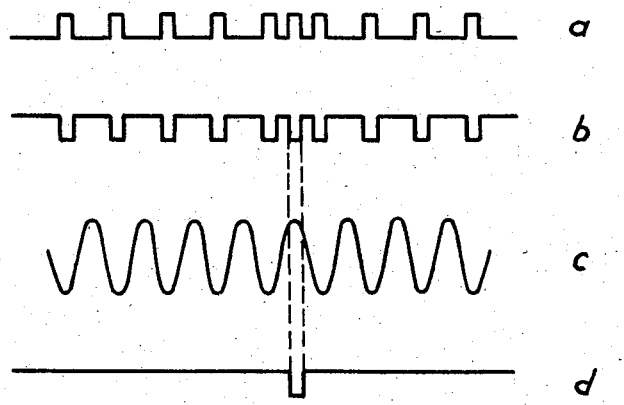

The invention will now be described more closely in connection with the accompanying drawings, in which Fig. 1 shows a device according to the invention, Fig. 2 different curve shapes at different points of the device, Fig. 3 a modified embodiment of the invention and Fig. 4 different curve shapes at different points of the device according to Fig. 3.

In the device according to Fig. 1 the pulses are applied via an input terminal 1 to the control grid in two tubes $V_1$ and $V_2$, respectively. In the present case the tube $V_1$ is a triode, and its object is to reverse the polarity of the input pulse train, which is then fed to a coincidence means from the anode output of the tube, said means consisting of two diodes $D_1$ and $D_2$ and the pulse transformer T. The other tube $V_2$, in this case a pentode, is connected by its anode to a resonant circuit $L_1C_1$ with a high Q-value. If the device is fed with a positive pulse train, see Fig. 2a, with for example the pulse repetition frequency 800 kc./s., and the resonant circuit in the anode circuit of the tube $V_2$ is tuned to said frequency, the negative pulses (Fig. 2b) at the anode of tube $V_1$ will appear simultaneously with the sinusoidal voltage (Fig. 2c) at the anode of the tube $V_2$ having its minimum, except in the case when one of the pulses of the pulse train has a time position differing from the normal one. If, as in the present invention, one or more of the pulses are forced to appear in the middle of the time interval between two pulses having normal time positions, these pulses will then appear at the anode output of the tube $V_1$ simultaneously with the sinusoidal oscillation at the anode of tube $V_2$ having its maximum. If the resonant circuit $L_1C_1$ has a high Q-value the pulses which appear at un-normal times will not in any appreciable degree affect the shape of the sinusoidal voltage at the anode of the tube $V_2$. The influence of said pulse can be further reduced by means of a feed-back winding $L_2$, inductively connected to the inductance $L_1$. From the anode, via the winding $L_2$ and the suppressor grid of the tube $V_2$, a sinusoidal voltage is then fed, the polarity of which is such that the potential of the suppressor grid is maximum (preferably equal to 0) when the pulses are applied to the control grid of the tube $V_2$, but minimum at the moment at which the pulse or pulses which are to be selected are applied to the control grid of the tube, such pulses thereby transferring a very small attenuating energy to the anode circuit. The sinusoidal oscillation at the anode of the tube $V_2$ is thereafter applied to the coincidence means $D_1$, $D_2$, T. The resonant circuit $L_1C_1$ is connected to a source of anode voltage having the reference + in series with a resistance R, the junction between the resonant circuit and the resistance being connected to earth over a condenser C. Owing thereto, the anode of the diode $D_2$ is given a lower bias voltage than the cathode of the diode $D_1$. Thus, the two diodes are normally blocked and no current can pass the primary winding of the pulse transformer T. A pulse with negative polarity normally appears on the cathode of the diode $D_1$ simultaneously with the sinusoidal voltage on the anode of the diode $D_2$ having its minimum. The diodes are then also blocked. This is also the case in the time interval between the pulses, in spite of the anode of the diode $D_2$ then being fed with the positive half period of the sinusoidal voltage. The difference between the bias voltage on the cathode of the diode $D_1$ and the anode of the diode $D_2$ is somewhat greater than the top amplitude of the sinusoidal voltage. However, the pulses which are to be selected appear as negative pulses on the cathode of the diode $D_1$ simultaneously with the anode of the diode $D_2$ being fed with the positive half period of the sinusoidal voltage. See Figs. 2 b and c. The diodes then pass the current during the duration of these pulses, and a current passes the primary winding of the pulse transformer T. Thus, pulses (see Fig. 2d) are obtained at the output of the transformer only during the duration of the pulses which are to be selected. Should these for example be modulated with regard to amplitude or duration, the pulses appearing over the output of the transformer will also be modulated in the same manner.

The device according to Fig. 1 can be modified in different manners. The coincidence means may for example consist of an electron tube to the cathode of which are fed negative pulses from the anode of the electron tube $V_1$, and to the control grid of which is fed the sinusoidal voltage obtained at the anode of the electron tube $V_2$.

The coincidence means may also consist of for example a pentode, to the control grid (suppressor grid) of which is fed the sinusoidal voltage, and to the suppressor grid (control grid) of which are fed the positive pulses appearing over the inputs 1 and 0.

The feed-back winding $L_2$ should in most cases be unnecessary, and therefore the electron tube $V_2$ may as well consist of a triode.

Fig. 3 shows a modified embodiment of the device according to Fig. 1. Here is used only one tube $V_3$, provided with three grids, the pulse trains being fed to the control grid of the tube. The screen grid is over a resonant circuit $L_1C_1$ connected to a positive D.C. source +, and the suppressor grid is over a winding $L_2$ connected to a negative bias voltage $-Eg$. The suppressor grid and the screen grid are inductively interconnected via the windings $L_1$ and $L_2$. A positive pulse train according to Fig. 4a is fed to the control grid of the tube and causes a sinusoidal voltage according to Fig. 4b in the screen grid circuit (the resonant circuit $L_1C_1$ in the screen grid circuit is here supposed to be tuned to 800 kc./s. and the pulse train has the same pulse repetition frequency). The voltage on the suppressor grid then varies according to Fig. 4c, i.e. it has the same phase as the voltage on the screen grid. The control grid of the electron tube has such a great negative bias that its cathode current is blocked during the duration of the applied positive pulses. These pulses normally appear simultaneously with the voltage on the screen grid and on the suppressor grid being minimum. The potential of the suppressor grid is thereby so low (lower than the cut-off voltage $V_{stryp}$ of the suppressor grid according to Fig. 4c), that no anode voltage is obtained. The whole cathode current then flows to the screen grid and feds energy to the resonant circuit $L_1C_1$. Only the pulses which are to be selected appear simultaneously with the voltage on the screen grid and on the suppressor grid being maximum. Thus, these pulses only can cause an anode current, and therefore pulses will appear over the output terminals 2 and 0 of the device simultaneously with the pulses which appear in the middle of an interval.

A method according to the invention can advantageously be used in multi-channel pulse communication systems for synchronizing a receiver with a transmitter. A channel pulse train is thereby superposed on a synchronizing pulse train, the pulses of which are forced to appear in the middle of a time interval. On the receiver side the synchronizing pulse train can in the above described manner easily be selected and used for synchronization of the receiver with the transmitter. The channel pulse trains may be modulated in any arbitrary manner, for example with regard to the amplitude, duration, time position, etc., of the pulses. If the modulation is transmitted as a variation of the energy contents of the pulses, a device for selection of the synchronizing pulses according to the invention should be preceded by a stage which limits the variation of the energy contents of the pulses. At for example amplitude modulation of the pulses said stage consists of amplitude limiting means. The cross-talk, which would otherwise arise owing to the sinusoidal voltage over the resonant circuit being superposed on modulation dependent frequency components, is thus reduced. From a cross-talk point of view the Q-value of the resonant circuit should also be as high as possible.

The pulses of the synchronizing pulse trains may have the same duration and amplitude as those of the pulses of the channel pulse trains and be unmodulated. This is however not a necessary condition in a device according to the invention. The pulses which are to be selected may as well have another shape than the other pulses or be modulated in an arbitrary manner.

A method according to the invention can thus for example be used in the following case. A multi-channel pulse communication system comprises a main route formed by two terminal exchanges and intermediate relay exchanges. There is furthermore a sub-route between one of the relay exchanges and a third terminal exchange. The channel pulse trains which are to be branched out from the main route at the relay exchange and sent to a third terminal exchange are at the transmitting terminal exchange given such time positions, that their pulses appear in the middle of the respective pulse intervals. At the relay exchange these pulses are selected in the described way and transmitted to the third terminal exchange. The corresponding process takes place for the pulses which are transmitted from the third terminal exchange to one of the other two exchanges. Alternatively, the time positions of these pulses may be adjusted at the branching out relay exchange.

The described embodiments are only some possible solutions of the principle of the invention and other modifications are naturally possible within the scope of the invention.

We claim:

1. A communication system for transmitting from the transmitter side to the receiver side pulse trains including intelligence pulses of equal duration spaced by substantially uniform time intervals, the transmitter side of said system comprising means for generating a non-modulated synchronizing pulse having the same duration as all the other pulses in a pulse train, and means for causing said synchronizing pulse to appear in the time interval between two pre-determined pulses in the pulse train; and the receiver side of said system comprising means for generating an alternating voltage having a frequency constant and equal to the inverted value of said uniform time intervals between the intelligence pulses in the pulse trains, coincidence circuit means and circuit means for simultaneously feeding to said coincidence means said alternating voltage and pulse train including the synchronizing pulse, said coincidence means passing synchronized pulses only.

2. A communication system according to claim 1, wherein said voltage generating means and said coincidence circuit means comprise an electron tube having a control grid, a screen grid and a suppressor grid, circuit means for feeding the pulse trains to the control grid, a resonance network having a high Q value and being tuned to a frequency equal to the inverted value of the time intervals between succeeding intelligence pulses, a source of a bias voltage connected in circuit with said network and said screen grid, and circuit means for feeding the alternating voltage appearing at the screen grid in phase to the suppressor grid, said electron tube generating an output pulse in its anode circuit in response to a pulse train including a synchronizing pulse but remaining blocked in response to a pulse train including intelligence pulses only.

3. A communication system according to claim 2, wherein induction circuit means couple said screen grid circuit and said suppressor grid circuit, and wherein said suppressor grid circuit includes a second source of a bias voltage having a polarity opposite to that of said first source.

References Cited in the file of this patent

UNITED STATES PATENTS

| | | |
|---|---|---|
| 2,431,577 | Moore | Nov. 25, 1947 |
| 2,490,039 | Earp | Dec. 6, 1949 |
| 2,648,766 | Eberhard | Aug. 11, 1953 |
| 2,654,028 | Levy | Sept. 29, 1953 |
| 2,666,135 | Barton | Jan. 12, 1954 |
| 2,676,254 | Valeton | Apr. 20, 1954 |
| 2,683,803 | Keizer | July 13, 1954 |
| 2,740,888 | Zukin | Apr. 3, 1956 |